Figure 1:
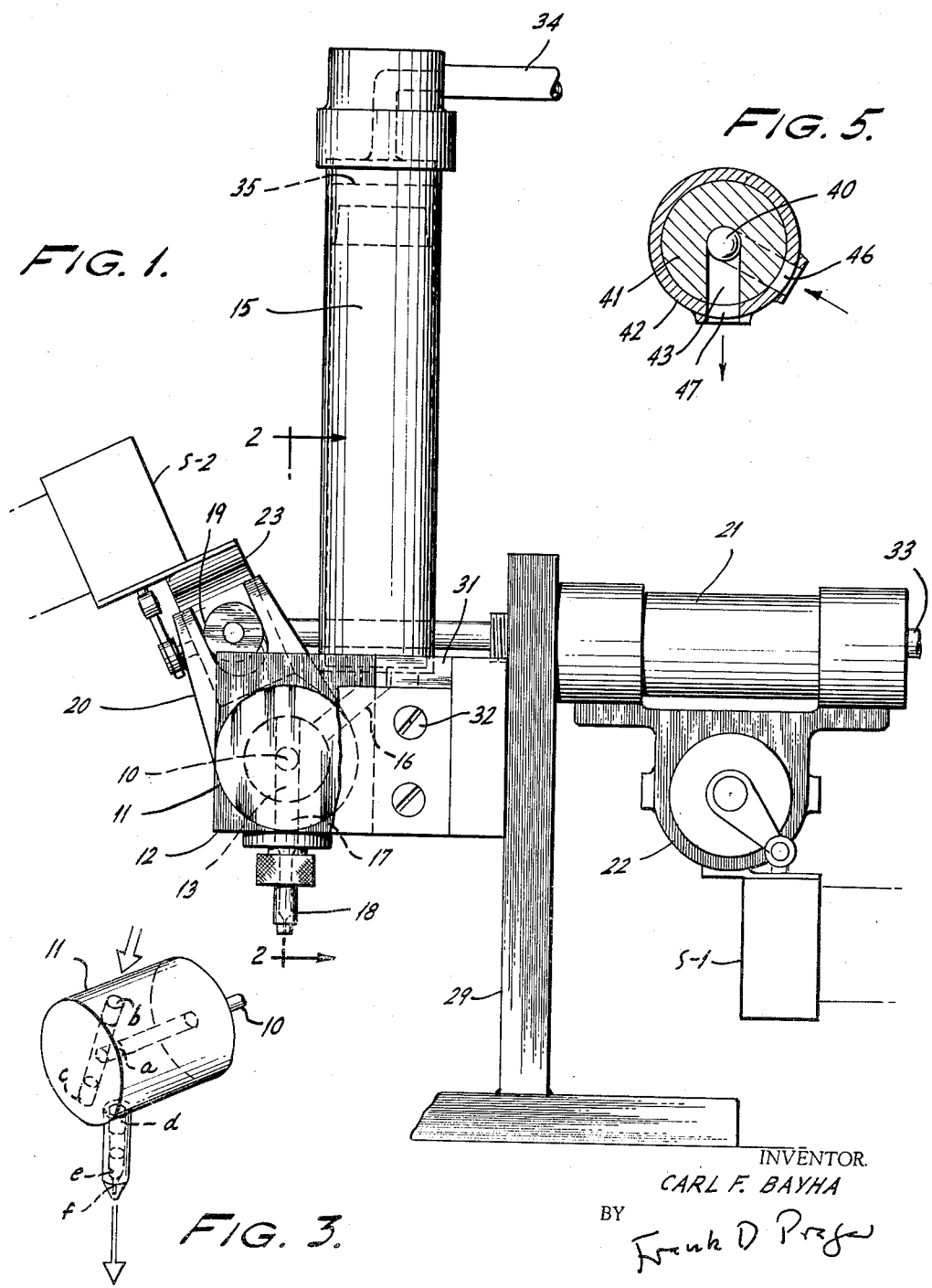

June 22, 1965 C. F. BAYHA 3,190,498
DISPENSING APPARATUS FOR FABRICATION OF TRANSISTORS AND THE LIKE
Filed Jan. 23, 1963 2 Sheets-Sheet 1

INVENTOR.
CARL F. BAYHA
BY
ATTORNEY

June 22, 1965  C. F. BAYHA  3,190,498
DISPENSING APPARATUS FOR FABRICATION OF TRANSISTORS AND THE LIKE
Filed Jan. 23, 1963  2 Sheets-Sheet 2

INVENTOR.
CARL F. BAYHA
BY
Frank D. Prager
ATTORNEY

United States Patent Office 3,190,498
Patented June 22, 1965

3,190,498
DISPENSING APPARATUS FOR FABRICATION OF TRANSISTORS AND THE LIKE
Carl F. Bayha, Hatfield, Pa., assignor to Philco Corporation, Philadelphia, Pa., a corporation of Delaware
Filed Jan. 23, 1963, Ser. No. 253,388
3 Claims. (Cl. 222—76)

This invention relates to a precision pump and a pump control system for measuring out viscous fluids or pastes. While of broader applicability, the concepts of the invention are well adapted for use in effecting measured dispensing of such fluids in minute quantities, and apparatus of this type is useful for instance in operations such as the filling of transistor housings with so-called potting compound. The invention will be described as applied to this particular service.

Although precision pumps and control systems for the same are available for dosage of medicine, chemical reagents, and the like, great difficulties were heretofore encountered when attempts were made to handle viscous fluids with such devices. Particularly when attempts were made to measure out batches of paste in rapid succession, many types of paste were heated to the point where the material began to evaporate; other viscous fluids underwent so-called thixotropic conversion when agitated due to friction or the like, or exhibited still other forms of physical impairment or breakdown. The generation of heat also caused mechanical trouble, such as sticking or leaking of valves or plungers. Abrasion of solid structures was also encountered in many cases. In general, it was difficult and often impossible to achieve any satisfactory degree of precision as well as speed, when trying to measure out paste, particularly in very small amounts.

Figure 2:
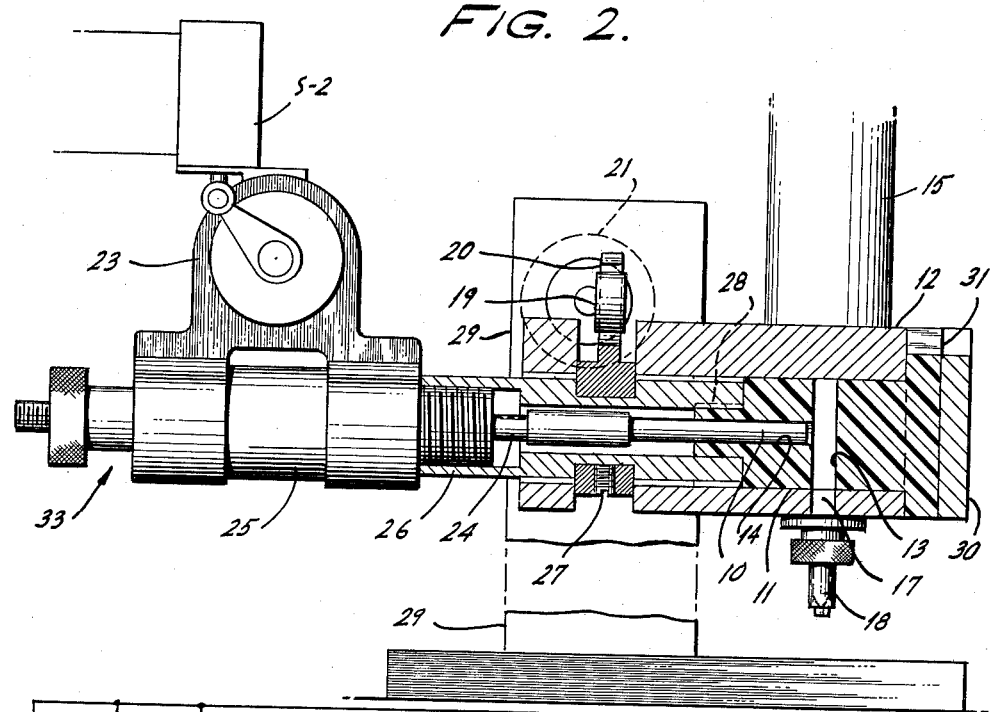
Figure 4:
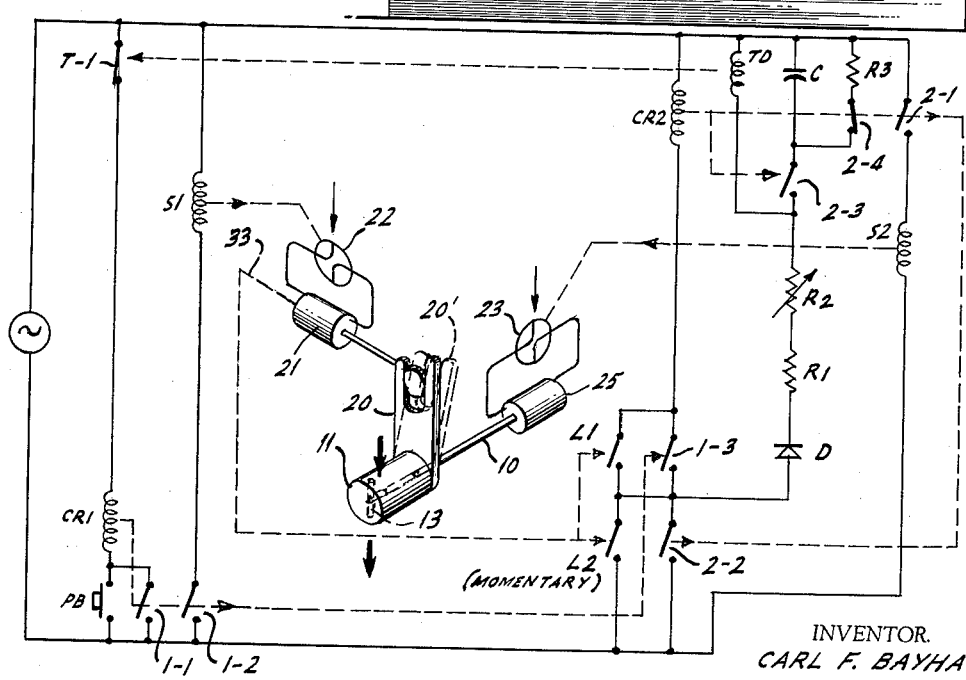

The invention overcomes difficulties of this type and provides apparatus which can operate both rapidly and precisely in the measuring of fluids, including even highly viscous pastes and the like. Most briefly expressed, this is achieved by a unique plug and plunger system, with resultant novel sequence of movements. Other objects and features of the invention will appear from the description which follows and from consideration of the drawing appended hereto, wherein:

FIGURE 1 is a front elevational view of a preferred embodiment of this invention. FIGURE 2 is a side elevational view showing an important portion of the same embodiment and particularly showing part of it in sectional view, generally taken along line 2—2 in FIGURE 1. FIGURE 3 is a schematic representation of active elements of this embodiment. FIGURE 4 is a similar representation of the same elements together with a complete showing of electrical and mechanical connections of the new control system. FIGURE 5 illustrates a modified pump and valve detail, shown in sectional view and otherwise oriented in the same way as the corresponding detail in FIGURE 1.

Referring primarily to FIGURES 1 and 2, the new structure comprises a reciprocable pumping pin or plunger 10 and a rotatable plug or spool valve 11 coaxial with this pin and surrounding it. A housing 12 surrounds the plug. Slidable fit is provided for the valve in its housing, and for the pin in the valve, and the arrangement is such that the pin is movable by small distances within the rotatable plug or valve, along the axis of the same (FIGURE 3). The plug has a single diametric fill and discharge passage 13 and a single axial plunger passage 14, the latter extending from a plunger end of the plug to the diametric passage.

A supply of the paste to be dispensed is stored in a reservoir 15 which can be connected with one end of diametric passage 13 by valve inlet port 16, FIGURE 1. When such connection is made, the opposite end of the diametric passage is blocked by housing 12. The valve unit can then be turned about the axis of pin 10 and into the illustrated position, wherein the opposite or discharge end of diametric passage 13 is connected with a second port 17, leading to a finely restricted outlet nozzle 18. At this time the first or inlet end of passage 13 is blocked by housing 12. In order to move the valve from one of these positions into the other, and then to return it to the first, the illustrated apparatus has a pusher mechanism 19, connected with the rotatable valve unit by fork and lever 20 as best shown in FIGURES 1 and 4. Pusher mechanism 19 is illustrated as a roller device engaging fork 20 and horizontally reciprocated by a rod emerging from cylinder 21. Application of compressed air or the like to this cylinder is controlled by a four-way valve 22. Air controlled by this valve reciprocates a piston (not shown) in the cylinder, which pistion by means of the pusher and fork causes the required rocking of valve 11.

A second and pump actuating four-way valve 23, FIGURE 2, is similarly arranged to actuate a piston and thereby horizontally to reciprocate a rod 24 for moving plunger 10 in axial passage 14 of plug valve 11. This second actuator unit is shown as including a cylinder 25 supported by an adaptor 26, said adaptor being secured to fork and lever 20 by setscrew 27 and to valve 11 by key 28; in this way the plug valve, adaptor, and actuator unit 11, 26, 25, 23, etc. perform rocking motions in unison, with and about pin 10.

Valve housing 12 and supply reservoir 15 are kept in stationary position on support 29, while actuator and pump unit 10, 11, 23, 24, 25 are free to undergo the above-mentioned rocking motions imparted by pusher 19. Stationary housing 12 is further shown as having a valve retainer 30 mounted thereon to preevnt axial displacement of rotary valve 11, in rightward direction in FIGURE 2, this retainer being a plate secured to an end surface 31 of the valve housing. It is held by fasteners 32, shown in FIGURE 1, wherein this retainer is broken off at the left hand end thereof to disclose the end surface of valve 11.

Small rectilinear strokes of central pin 10 are utilized to provide the desired pumping action and, in accordance with the invention, this action takes place within inlet-outlet valve structure 11 and in peculiar coordination with the operation of the valve. The precise length of the pump stroke, and the corresponding amount of viscous liquid discharged thereby, can be varied by suitable internal stop means, not shown, adjustable by mechanism 33 at the exposed end of cylinder 25, FIGURE 2 It will be seen that the valve passages of the new pump are utilized not only as transfer ducts for incoming and outgoing liquid but also as a measuring cup or container. The system of ducts is kept filled by a mass of the viscous fluid from the reservoir. The volume of this mass changes as the pin or plunger reciprocates, and, as indicated in FIGURE 3 an amount a of viscous liquid is drawn into and then expelled from the axial passage by each cycle of rearward and forward motions of the pin or plunger. The combined pump and valve structure serves to effect further hydraulic and translatory movements of such liquid.

Combined plunger and valve movements are of course well known in the art. However, in contrast to other combinations of this general type, the new unit provides a distinctive, stepwise sequence of hydraulic actions and mechanical translatory movements, applied to batches or portions of the paste to be dispensed. This novel sequence of actions will now be described.

*Filling.*—When the front end of pin 10, FIGURE 3, is withdrawn from adjacent the transverse duct to a point between that duct and the remote or plunger end of valve 11, while the lower end of the transverse duct is closed and while pressure is applied to the top of reservoir 15, by a pressure duct 34 and piston 35 (FIGURE 1), a small amount *a* of viscous liquid from the upper part of the transverse duct is drawn into the axial region newly vacated by the pin, while a corresponding amount *b* enters the upper end of the transverse duct, from the supply reservoir (upper arrow), thereby keeping this duct filled as already indicated. This hydraulic transfer of amount *a* and introduction of amount *b* are effected with a minimum of frictional resistance, as the paste moves only by minor distances and through unobstructed passages which, by comparison with this distance, are of large area. It might be noted that, while mass *b* is shown as a sharply defined and delineated cylinder, such mass of course may assume various forms, more or less distorting the purely cylindrical form, as need not be described in detail. This applies also to other liquid bodies to be mentioned presently.

*Transfer.*—The newly received liquid mass *b*, together with a corresponding mass *c* at the other end of the transverse passage, is physically translated by purely mechanical rotation of the valve plug and without any appreciable hydraulic friction, as the pusher and fork mechanism rotates the valve to establish the vertical position of the transverse duct.

*Discharge.*—During a then ensuing forward stroke of pin 10, liquid body *a* is expelled from the axial passage, thereby causing liquid body *c* at the lower end of the transverse passage to be expelled from that passage into position *d* in the discharge nozzle, as the upper end of the transverse passage is blocked at this time. This in turn causes a corresponding amount *e* to pass through the highly restricted orifice *f*, see lower arrow in FIGURE 3.

Only during this discharge stroke of the new pump unit, as described, some appreciable hydraulic friction is overcome. It is encountered at the restricted orifice *f*, and is overcome by means of the pneumatic pressure applied to plunger 10. This friction is encountered only at the discharge end of the series of liquid dispensing passages, so that substantially all of the heat generated in the liquid can then be dispersed to the ambient atmosphere, or to some other heat sink outside of the pump, instead of being accumulated in liquid which remains in the pump.

Heating up of structural pump or valve parts is also minimized by these arrangements, even if pumping actions be repeated at relatively high frequency. In addition, the turning of valve 11 is facilitated by making the surface of valve plug 11 of a material having low friction when moving relative to the metal of housing 12. Since abrasive particles are sometimes encountered in the paste to be dispensed, this material is desirably selected so as to minimize abrasion or scoring. The use of a synthetic plastic material such as polytetrafluoroethylene is therefore preferred, such material being made by E. I. du Pont de Nemours Company under the trade mark "Teflon," or the valve could be polytrifluorochloroethylene, a product of M. W. Kellogg Co. known under the trade mark "KEL–F."

*Modified pump action.*—Instead of reciprocating outside of transverse duct 13, pin 10 may also enter into this duct, in which case the batch-measuring function is partly (or even entirely) performed by a portion of this duct.

In effect, the axial and transverse ducts in plug 11 constitute a single cavity, the volume of which is modified by the movements of pin 10. In any event the material dispensed by the new pump can be received in a transistor capsule, manually or automatically held below nozzle 18. Pursuant to termination of the dispensing cycle, ducts 17 and 18 remain filled with viscous paste, ready for renewed, added filling on rearward retraction of pin 10.

The automatic operation of the complete dispensing system can best be described with reference to FIGURE 4. Let it be assumed that initially, all circuits are de-energized, the actuating fork or plug valve 11 is in inclined (filling) position 20', pin 10 of the pump has been backwardly withdrawn from this duct 13, in valve 11, and valve duct 13 has thereby been filled with viscous liquid (upper heavy arrow).

In order to start operation, push button switch PB is depressed and then released. This action energizes a control relay coil CR1, thereby closing three normally open relay switches 1–1, 1–2 and 1–3. One of these (1–1), establishes holding circuit for the relay. Another (1–2) causes energization of solenoid S1, which then actuates four-way valve 22 and thereby turns fork 20 and plug valve 11 to turn duct 13 into vertical or discharge position. At the start of this turning movement, a cam (not shown) on a rod 33 associated with the valve mechanism closes a normally open limit switch L1, which is then held closed until this rod and valve mechanism has been returned to its original position, as will be described; and still further, at the completion of the movement turning duct 13 to discharge position, a second limit switch L2 is momentarily closed by a second cam (not shown) which is arranged to operate in and only in this particular phase of the program (not during a subsequent return stroke). In series with limit switch L2 are: (first) a parallel circuit having L1 in one branch and having in the other branch the last (1–3) of the relay switches initially closed and held closed by the aforementioned energization of coil CR1, and (second) another relay coil CR2. This latter coil is accordingly energized at the moment of completion of the aforesaid valve-turning movement, and it then energizes the second or pump solenoid S2 through a normally open relay switch 2–1. Holding circuit for CR2 is made by an additional switch 2–2 of this relay, in parallel with the momentary limit switch L2 and in series with the aforementioned parallel circuit. Still another relay switch (not shown) can cause insertion of an empty transistor housing below the discharge end of duct 13. The energization of solenoid S2 then actuates four-way valve 23, which causes a forward stroke of pin 10. Since duct 13 is then in vertical or discharge position there follows discharge of paste or potting compound, as indicated by the lowermost vertical arrow.

As already mentioned, the liquid is discharged through a small orifice, so that a small but positive frictional load is overcome incident to the liquid discharge action, which action therefore requires a certain time interval, such for instance as .5 to 1.5 seconds. The circuit of a suitable time delay relay TD, more fully described hereinafter, is caused by the momentary closure of limit switch L2 and the ensuing closure of the parallel CR2 switch 2–2 to initiate measuring such a time period.

At the end of this period relay TD operates, opening a normally closed switch T–1 in series with the coil of valve actuating relay CR1, thereby de-energizing this relay and opening the switches thereof. The opening of switch 1–2 de-energizes solenoid S1, thus allowing gravitational return of four-way valve 22 to its original position, and thereby in turn returning fork and plug valve unit 20, 11 to its original position 20'. Completion of this latter valve operation causes cam rod 33 to allow limit switch L1 to return to its normal, open position. The other limit switch L2 is also open, having been closed only once, momentarily; and as indicated, all CR1 switches, including 1–3, have returned to open position. Therefore, the CR2 coil is now de-energized, causing de-energization of pump solenoid S2, gravitational return of its four-way valve 23, and rearward retraction of pin 10. This latter action occurs with valve duct 13 in inclined (filling) position and therefore causes replenishing of the liquid or paste supply in valving and measuring passages 13, 14, from the supply of liquid or paste (upper heavy arrow). The initially assumed condition is thus established. Returning briefly to *time delay relay TD*, a circuit for this relay is disposed in series with the parallel circuits L2 and 2–2, and this time delay relay circuit includes, in series, a rectifier D, resistors R1 and R2, the latter being adjustable, a normally open switch 2–3 controlled by CR2, and a condenser C. Actuation of CR2 initiates the timing action by closing switch 2–3 and opening switch 2–4. A time delay, predetermined or adjusted by R2, elapses as condenser C charges up through the two resistors. When a certain charge has been reached, corresponding current passes through TD, in parallel with C, and TD operates. (Current then continues to pass through TD and C until CR2 is de-energized, at which time 2–3 opens and 2–4 closes, discharging C through R3.)

A number of modifications can be applied to the described apparatus. For instance, as shown in FIGURE 5, a central plunger 40 and surrounding plug valve 41 can be used, which has only radial, not diametric arrangement of a transverse valve duct 43 to minimize the volume of this duct and thereby to minimize irregularities for instance in the event that some minute particles of gas are mixed with the viscous paste and that the paste is therefore compressible to some extent. In this case an inlet duct 46 may desirably be located laterally, in the interest of relatively small angular motion from 47 to 46 and vice versa; and it may be preferred to use a very short discharge duct 47 in valve housing 42.

While only two forms of the new pump and one form of the new control system have been shown, the details thereof are not to be construed as limitative of the invention. The invention contemplates such variations and modifications as come within the scope of the appended claims.

I claim:

1. A system for feeding measured amounts of paste, comprising a ported reservoir structure for paste; a valve having a ported recess, said valve being movable in said ported structure and including limit switch means; a plunger reciprocable in said valve to discharge paste therefrom through said ported structure; first power means for reciprocably moving the valve in said ported structure; second power means for reciprocably moving the plunger in said valve; and control means including relay means controlling said several power means for successively actuating the first and second power means to move the valve and plunger, respectively, to first positions in said structure to cause filling of said recess with paste from said reservoir, for then actuating the first power means to move the valve to a second position thereof for discharge of paste, and for finally, when the valve has reached the second position, actuating the limit switch means to actuate the relay means and thereby the second power means to move the plunger to a second position thereof for said discharge.

2. A system for feeding measured amounts of paste, comprising a ported reservoir structure for paste; a valve having a ported recess, said valve being movable in said ported structure; a plunger reciprocable in said valve to discharge paste therefrom through said ported structure; first power means for reciprocably moving the valve in said ported structure; first relay means for controlling said first power means; second power means for reciprocably moving the plunger in said valve; second relay means for controlling said second power means; control means for cyclically actuating the first and second relay means to actuate respectively the first and second power means to move the valve and plunger, respectively, to first positions in said ported structure to cause filling of said recess with paste from said reservoir, then to actuate the first power means to move the valve to a second position thereof for a discharge of paste, and finally to actuate the second power means to move the plunger to a second position thereof for said discharge; and a time delay device operable during said discharge of paste to delay operation of the first relay means and first power means for moving the valve to its first position.

3. A pump system particularly for precision pumping of viscous liquid, comprising a valve housing; a valve slidably disposed in said housing and having a recess; a rod or pin reciprocable in said recess; first power means for sliding the valve back and forth in said housing; second power means for reciprocating the rod or pin in said valve; first control means including a pushbutton switch or the like and a self-holding relay controlled thereby for actuating the first power means to slide the valve to a first position in said housing for filling said recess with viscous liquid; second control means including a circuit jointly controlled by said relay and by said several power means for then actuating the second power means to move the rod or pin to cause such filling; third control means for then actuating the first power means to move the valve to another position in said housing for discharge of viscous liquid; and fourth control means for then actuating the second power means to move the rod or pin to another position to cause said discharge.

References Cited by the Examiner

UNITED STATES PATENTS

| 397,452 | 2/89 | Winters et al. | 222—409 X |
| 2,336,355 | 12/43 | Hallead | 222—309 X |
| 2,768,581 | 10/56 | Langemack | 222—309 X |
| 2,824,673 | 2/58 | Hanlon | 222—256 |
| 2,882,999 | 4/59 | Morgan | 222—249 X |

FOREIGN PATENTS 307,186  3/29  Great Britain.

LOUIS J. DEMBO, *Primary Examiner.*

RAPHAEL M. LUPO, *Examiner.*